(12) United States Patent
Bhat et al.

(10) Patent No.: US 9,196,074 B1
(45) Date of Patent: Nov. 24, 2015

(54) REFINING FACIAL ANIMATION MODELS (75) Inventors: Kiran S. Bhat, San Francisco, CA (US); Delio Tramontozzi, Corte Madera, CA (US); Tim Harrington, Novato, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 880 days.

(21) Appl. No.: 13/168,389

(22) Filed: Jun. 24, 2011

Related U.S. Application Data (60) Provisional application No. 61/408,496, filed on Oct. 29, 2010.

(51) Int. Cl.
*G06T 13/40* (2011.01)

(52) U.S. Cl.
CPC ....................................... *G06T 13/40* (2013.01)

(58) Field of Classification Search
None
See application file for complete search history.

(56) References Cited

U.S. PATENT DOCUMENTS

| | | | | |
|---|---|---|---|---|
| 7,068,277 B2 * | 6/2006 | Menache | ....................... | 345/473 |
| 2007/0236501 A1 * | 10/2007 | Kim et al. | ..................... | 345/473 |
| 2008/0117215 A1 * | 5/2008 | Hery | .............................. | 345/473 |
| 2008/0170777 A1 * | 7/2008 | Sullivan et al. | ................ | 382/154 |
| 2009/0066700 A1 * | 3/2009 | Harding et al. | ............... | 345/473 |
| 2009/0195545 A1 * | 8/2009 | Debevec et al. | .............. | 345/473 |

OTHER PUBLICATIONS

Botsch, Mario et al., "On Linear Variational Surface Deformation Methods." IEEE Transactions on Visualization and Computer Graphics, vol. 14, Issue 1, Jan. 2008, 18 pgs.

Ulbrich, Ed, "How Benjamin Button got his face." Notes from video accessed on-line, http://www.ted.com/talks/ed_ulbrich_shows_how_benjamin_button_got_his_face.html, Feb. 2009, 5 pages.

* cited by examiner

*Primary Examiner* — Andrew Yang
(74) *Attorney, Agent, or Firm* — Kilpatrick Townsend & Stockton LLP (57) ABSTRACT

A system includes a computing device that includes a memory configured to store instructions. The computing device also includes a processor configured to execute the instructions to perform a method that includes producing an animation model from one or more representations of an object provided from a deformable likeness of the object. The one or more representations are based upon position information from a collection of images of the object captured by at least one camera. The method also includes refining the animation model to produce representations that substantially match the one or more representations provided by the deformable likeness of the object. Refining the animation model is based upon the position information from the collection of images of the object and one or more constraints.

53 Claims, 6 Drawing Sheets

REFINING FACIAL ANIMATION MODELS

CLAIM OF PRIORITY

This application claims priority under 35 USC §119(e) to U.S. Patent Application Ser. No. 61/408,496, filed on Oct. 29, 2010, the entire contents of which are hereby incorporated by reference.

TECHNICAL FIELD

This document relates to a system for producing facial models for animation.

BACKGROUND

Ever increasing computational power allows complex calculations to be tackled with increased efficiency in less time. For example, robust computer systems can execute applications to simulate objects such as fictional characters and even realistic-looking human forms. Such simulated beings can be placed in many virtual situations that would be considered hazardous for an actual person. For example, rather than place an actor in a dangerous location to shoot film footage for a motion picture, a seemingly identical simulation of the actor may be created to perform in a virtual copy of the risky environment. A step further, the motion picture may be entirely animated and only include performances of simulated actors.

SUMMARY

In one aspect, a computer-implemented method includes producing an animation model from one or more representations of an object provided from a deformable likeness of the object. The one or more representations are based upon position information from a collection of images of the object captured by at least one camera. The method also includes refining the animation model to produce representations that substantially match the one or more representations provided by the deformable likeness of the object. Refining the animation model is based upon the position information from the collection of images of the object and one or more constraints.

Implementations may include any or all of the following features. Refining the animation model may include adjusting the position of vertices included in the animated model to match the position information from the collection of images. Refining the animation model may include adjusting the position of vertices included in the animated model that lack corresponding vertices in the position information from the collection of images. Refining the animation model may include using a Laplacian deformer to adjust the position of vertices included in the animation model. The deformable likeness may be produced from a scanned representation of the object. The object represented in the collection of images may include features for defining motion. The features may include artificial features, nature features, etc. The representations may include facial expressions. The object may be a face of an actor.

In another aspect, a system includes a computing device that includes a memory configured to store instructions. The computing device also includes a processor configured to execute the instructions to perform a method that includes producing an animation model from one or more representations of an object provided from a deformable likeness of the object. The one or more representations are based upon position information from a collection of images of the object captured by at least one camera. The method also includes refining the animation model to produce representations that substantially match the one or more representations provided by the deformable likeness of the object. Refining the animation model is based upon the position information from the collection of images of the object and one or more constraints.

Implementations may include any or all of the following features. Refining the animation model may include adjusting the position of vertices included in the animated model to match the position information from the collection of images. Refining the animation model may include adjusting the position of vertices included in the animated model that lack corresponding vertices in the position information from the collection of images. Refining the animation model may include using a Laplacian deformer to adjust the position of vertices included in the animation model. The deformable likeness may be produced from a scanned representation of the object. The object represented in the collection of images may include features for defining motion. The features may include artificial features, nature features, etc. The representations may include facial expressions. The object may be a face of an actor.

In another aspect, a computer program product tangibly embodied in an information carrier and comprising instructions that when executed by a processor perform a method that includes producing an animation model from one or more representations of an object provided from a deformable likeness of the object. The one or more representations are based upon position information from a collection of images of the object captured by at least one camera. The method also includes refining the animation model to produce representations that substantially match the one or more representations provided by the deformable likeness of the object. Refining the animation model is based upon the position information from the collection of images of the object and one or more constraints.

Implementations may include any or all of the following features. Refining the animation model may include adjusting the position of vertices included in the animated model to match the position information from the collection of images. Refining the animation model may include adjusting the position of vertices included in the animated model that lack corresponding vertices in the position information from the collection of images. Refining the animation model may include using a Laplacian deformer to adjust the position of vertices included in the animation model. The deformable likeness may be produced from a scanned representation of the object. The object represented in the collection of images may include features for defining motion. The features may include artificial features, nature features, etc. The representations may include facial expressions. The object may be a face of an actor.

In another aspect, a system includes a first processing stage computing device that includes a memory configured to store instructions. The first processing stage computing device also includes a processor configured to execute the instructions to perform a method that includes producing an animation model from one or more representations of an object provided from a deformable likeness of the object. The one or more representations are based upon position information from a collection of images of the object captured by at least one camera. The system also includes a second processing stage computing device that includes a memory configured to store instructions. The second processing stage computing device also includes a processor configured to execute the instructions to perform a method that includes refining the animation model to produce representations that substantially match the one or more representations provided by the deformable likeness of the object. Refining the animation model is based upon the position information from the collection of images of the object and one or more constraints.

Implementations may include any or all of the following features. Refining the animation model may include adjusting the position of vertices included in the animated model to match the position information from the collection of images. Refining the animation model may include adjusting the position of vertices included in the animated model that lack corresponding vertices in the position information from the collection of images. Refining the animation model may include using a Laplacian deformer to adjust the position of vertices included in the animation model. The deformable likeness may be produced from a scanned representation of the object.

Various implementations of the subject matter described here may provide one or more of the following potential advantages. In one implementation, a two-stage system may be used to produce and refine an animation model capable of rendering representations of an actor or a portion of the actor (e.g., the actor's head). A less than highly-accurate initial animation model may be efficiently and cost-effectively produced to conserve production time, budget and resources. By refining the animation model by using motion data captured from the actor during a performance (e.g., facial expressions of the actor while performing a character), recognizable representations of the actor may be produced that appear realistic to an end viewer.

Details of one or more implementations are set forth in the accompanying drawings and the description below. Other features, aspects and advantages will be apparent from the description and drawings, and from the claims.

DETAILED DESCRIPTION

In motion pictures and other offline applications and online application (e.g., virtual environment such as a video game), an electronically created representation of an actor (e.g., referred to as a digital double) may be used as a stand in for a human actor. For example, a scene may be shot with a performance actor such as a stunt-performer, martial artist, or character actor. A digital double may be rendered and displayed over the performance actor to make it appear that a different actor or asset was in the scene. One method by which such a digital double can be created can involve producing a less than highly accurate animation model (referred to as a basic rig) and then performing adjustments to produce a refined animation model that more accurately represents the asset for being rendered.

Figure 1:
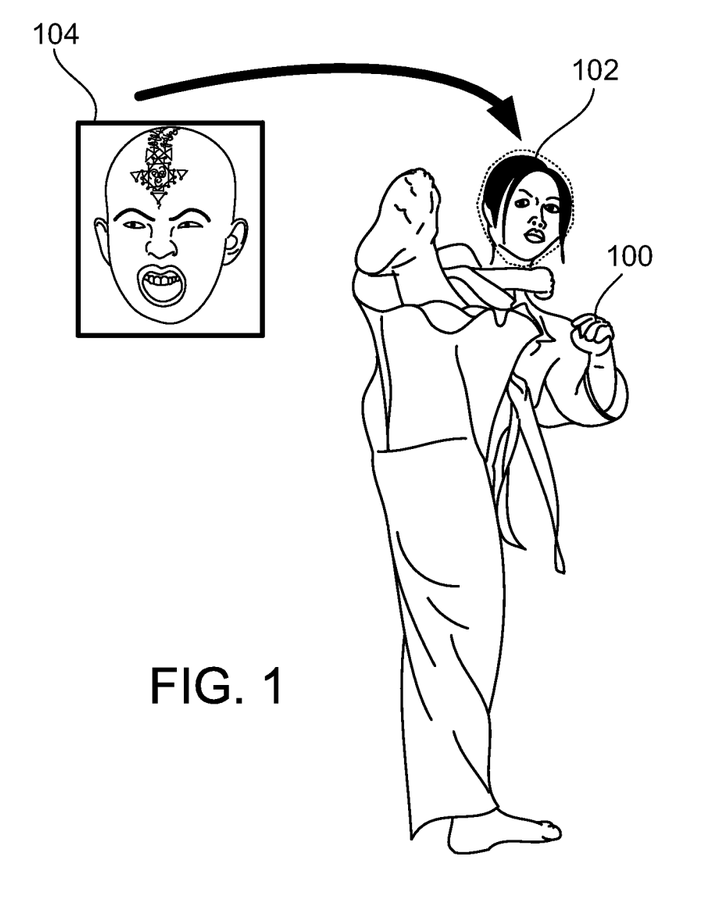
FIG. 1 illustrates the use of a digital double replacing a portion of a performance actor.

FIG. 1 illustrates the use of a digital double with a performance actor. In this example, a young male child actor is to portray a martial artist in a motion picture. Some of the scenes in the motion picture may call for the child actor to perform in a dangerous environment, or call for the child actor to perform stunts that he is not capable (e.g., high flying acrobats, etc.).

In this example, a slightly older female performer 100, whose body build does not significantly differ from the young male actor, may be capable of performing the stunts needed for the production. To give the perception (to an end viewer) that the male actor is actually performing these stunts, a digital double of the actor's head 104 replaces (e.g., is superimposed upon) a corresponding portion (highlighted by a dashed line 102) of the older female 100 performed in the captured footage. Typically the digital double of the actor's head includes a three-dimensional model to provide the needed flexibility (e.g., compared to two-dimensional imagery). For example, a three-dimensional model may provide more flexibility for editing facial expressions (e.g., broaden a smile, adjust eye-blinks, etc.), accounting for different image capture conditions (e.g., camera movement, lighting conditions, etc.), etc.

Digital doubles can be used for other purposes. For example, digital doubles may be a model or cartoon used in a life action or animated film. Along with being used to replace portions of a performing actor (e.g., replacing the head of the older female actor 100 with the head of the child actor 104), a digital double can be animated, e.g., to mirror facial expressions (provided by the child actor 104). Various types of animated scenarios may implement such digital doubles, for example, an anthropomorphic animal, an injured character, a character that experiences sudden weight loss or gain, etc.

One or more techniques and methodologies may be implemented to produce such digital doubles. For example, a digital double can be represented by an animation model (e.g. a three dimensional numerical mesh) in a computer system that mathematically defines the shape and motion of the underlying asset. In one technique, the animation model can be generated by a two-stage process. First, a relatively basic animation model is created and animated to track an actor's performance (e.g., track the facial expressions of the actor). Next, the shape of the animation model (e.g., a three-dimensional numerical mesh) can be refined to more accurately represent the actor (e.g., features present in the actor's face).

Along with off line (e.g., motion picture production) and online applications (e.g., video game production), such refined animation models may be used for various types of applications. For example, such animated models may be used in the medical field, e.g., to provide an anatomy model of a patient.

Figure 2:
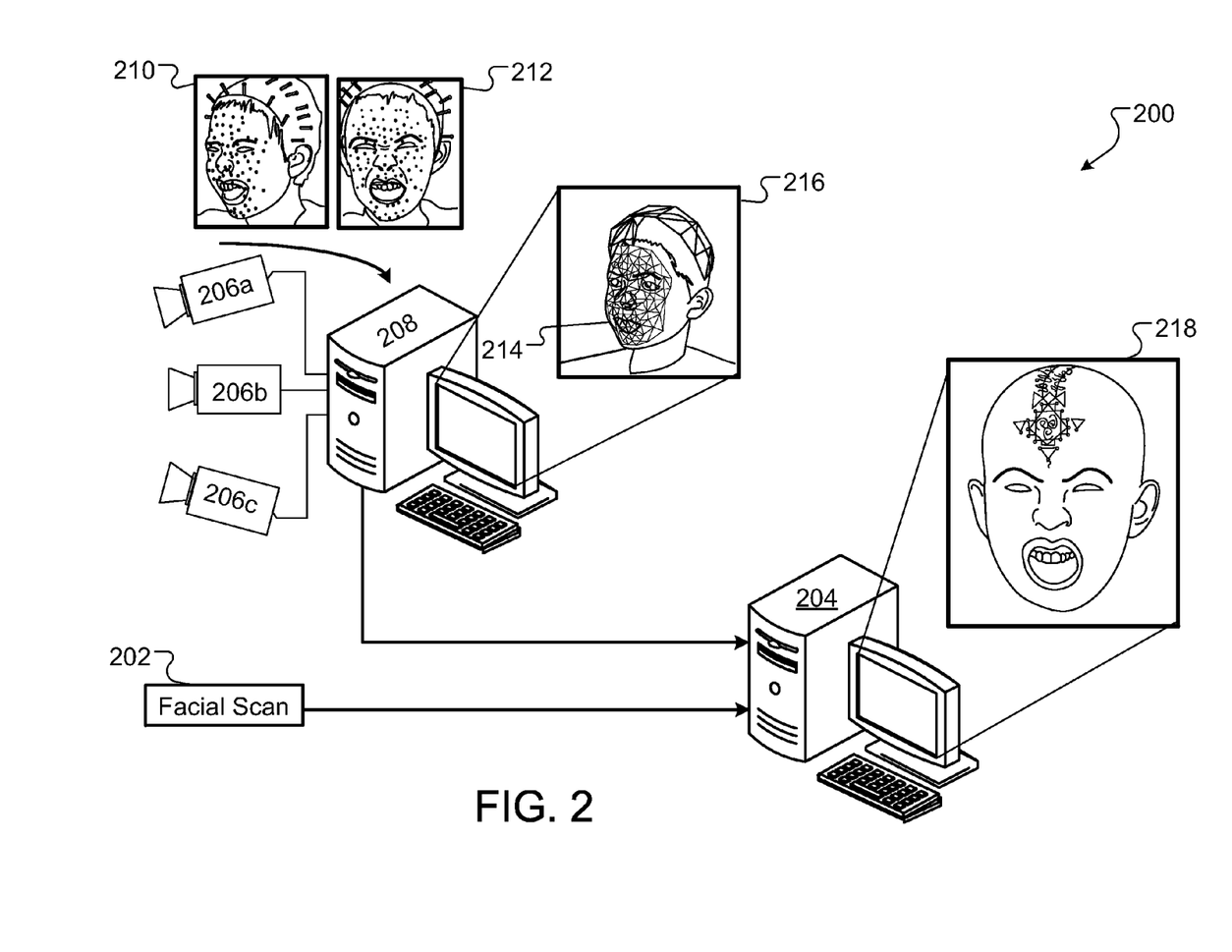
FIG. 2 is a block diagram of a multi-stage animation system.

FIG. 2 is a block diagram of an animation system 200 that implements a two-stage process, for example, to produce and refine an animation model (e.g., a digital double of an actor's head). In this implementation, the system 200 initially produces a relatively basic animation model, and, modifies the shape of the model to improve the accuracy in matching the represented object (e.g., expressions on an actor's face). In this arrangement, a first stage produces the relatively basic animation model from one or more data sets. For example, a highly-detailed representation (e.g., electronically sculpted) of the actor's face may be provided to the system 200. However, creating such a detailed representation typically calls for significant time (e.g., for an animator to electronically sculpt multiple facial expressions for a performance) and resources (e.g., computational, budget, etc.). However, starting with a less accurate representation may allow saving in both processing time and resources. In the second stage, refinements may be applied to improve accuracy such that the final animation model closely matches the actor (e.g., the facial expressions). As such, projects (e.g., motion pictures) with accelerated production schedules and modest budgets may consider such a two-stage process as economically attractive for both efficient model production and frugal use of resources.

One or more techniques may be used to produce data that represents a likeness of the actor in the first processing stage. For example, by electronically scanning an actor's face, a likeness (e.g., a three-dimensional numerical mesh) can be produced that represents the general shape of the actor's face. In some arrangements, the actor may relax his or her facial muscles such that a neutral expression is scanned and represented in by the likeness. In some instances, a relatively few adjustments may be needed to produce an initial model from the scanned likeness. For example, if the final model is to provide an animation of the actor, very little adjustments to the scanned likeness may be needed. For situations in which the final model is for providing an animated character quite different from the actor (e.g., a non-human creature being played by actor), the scanned likeness of the actor may be adjusted (e.g., electronically sculpted to add features of the creature) before moving forward to create the final animation model. Control parameters associated with portions of the likeness (anatomical features) may also be manipulated for producing adjustments. For example, a control parameter may allow adjustments to the angle of the actor's jaw represented in the likeness. By changing the jaw angle control parameter, the likeness is deformed for various representations (e.g., mouth opens, cheeks stretch vertically, chin moves down, etc.).

In this particular arrangement, scan data 202 of the actor's face is collected and provided to a computer system 204 for production of a deformable likeness and for allowing a user (e.g., an animator) to adjust the likeness (e.g., electronically sculpt), for example, by manipulating one or more control parameters. Additional components may also be incorporated into the system 200 for such operations, for example, multiple computing devices may be implemented for producing a deformable likeness, e.g., of an actor's face.

To produce an animation model (e.g., of an actor, a character being partially performed by the actor, etc.), the system 200 also collects motion information. For example, data may be collected that represents facial expressions of the actor for a performance (e.g., a role in a motion picture). Along with the produced likeness of the actor (e.g., facial scan data 202), by using the motion information, an animation model of the actor may be efficiently created.

One or more techniques may be implemented for collecting such motion information. For example, an array of camera (e.g., represented with three cameras 206a, 206b, 206c) can be used to capture images (e.g., from three distinct perspectives) of the actor's face and provide data that represents the imagery to a computer system 208. To capture the motion and corresponding position changes of facial features various techniques may be implemented, for example, artificial markers may be applied to the actor (e.g., adhered in a pattern across the actor's face). One or more paints may be used to provide the pattern of markers. Paints (e.g., phosphorus) may cover entire portions of the actor's face to highlight features (e.g., cheek structure, chin, nose, etc.) for motion capture. In still other arrangements, facial features may be distinct enough such that paint or markers are not needed for motion capture. In this particular example, as represented in images 210, 212 (that represent two of the perspective views captured by the camera array), darker colored (e.g., black) markers are used to highlight features of the actor's face and lighter colored (e.g., white) markers that contrast with the actor's hair are used to highlight movements of the upper portion of the actor's head.

Provided the captured imagery (e.g., images 210, 212), the computer system 208 calculates the position of each marker along with the position changes of the markers. For example, the marker position information may be used to create a relatively low-resolution representation of the actor's face as defined by the marker positions. Such as representation (referred to as a tracking cage) may be a mesh of polygons with vertices that are defined by the captured position data of the markers. Over the capture time period, as the positions of the markers change (with the actor's performance), the positions of the vertices of the low-resolution mesh correspondingly change. Illustrated as being presented on a display of the computer system 208, a tracking cage 214 is shown overlaying a captured image 216.

Once collected and efficiently processed into a digital representation (e.g., a tracking cage), the motion data may be provided to the computer system 204 for combining this relatively low resolution performance data with the higher resolution data of the scanned likeness of the actor (or the character performed by the actor), for example. From these two combined data sets, and possibly other information, an animation model can be created. In one arrangement, locations in the scanned likeness can be identified that correspond to locations of the markers (e.g., when the tracking cage represents a neutral expression, similar to the scanned likeness). Upon establishing a link between the marker locations and corresponding locations in the scanned likeness, the motion data can be used to deform the scanned likeness (to track the captured facial expressions performed by the actor). For example, the motion data may be used to adjust control parameters to deform the deformable scanned likeness into a corresponding facial expression.

The combined data, from the motion capture and the scanned likeness, may be used by the first processing stage to create an initial animation model (e.g., of the actor, a performed character, etc.). For example, the computer system 204 may be used (e.g., by an animator) to select multiple poses (e.g., facial expressions) that are used to create an animation model. In some instances, one or more poses may also be created by an animator, for example, by adjusting control parameters such that the representation of the scanned likeness (e.g., a facial expression) matches imagery (e.g., images of facial expressions) being viewed by the animator. The initial animation model produced by the first processing stage may relatively closely represent the selected input poses and other poses (e.g., intermediate poses). However, the representations (e.g., the shapes of facial features) from the animation model may not necessarily be the same, for example, as represented in the captured images of the actor or the selected poses.

A second processing stage is executed by the computer system 204, in this example, to address the differences between representations produced by the animation model and the representations provided from the captured motion information. In one arrangement, one or more techniques may be implemented for refining the animation model, for example, a second solver may be used to effectively equate to the motion capture data (e.g., the positions of the vertices of the cage) with the initial animation model. Along with again executing solver operations in the second stage, additional information may be used by the solver of the second stage. For example, one or more constraints may be used by the solver (e.g., exclude locations near eye corners, etc.). By refining the animation model, vertices of the scanned likeness are in effect "snapped" to the vertices of the motion data. Upon completion of the second processing stage, a refined animation model may be used to produce high resolution representations (e.g., of the actor, the performing character, etc.) that may closely track the representations from the motion information (and represented in the captured images). For example, the refined animation model may be used to produce a high resolution image 218 for creating a digital double of the actor's head in a production (e.g., a motion picture).

Figure 3:
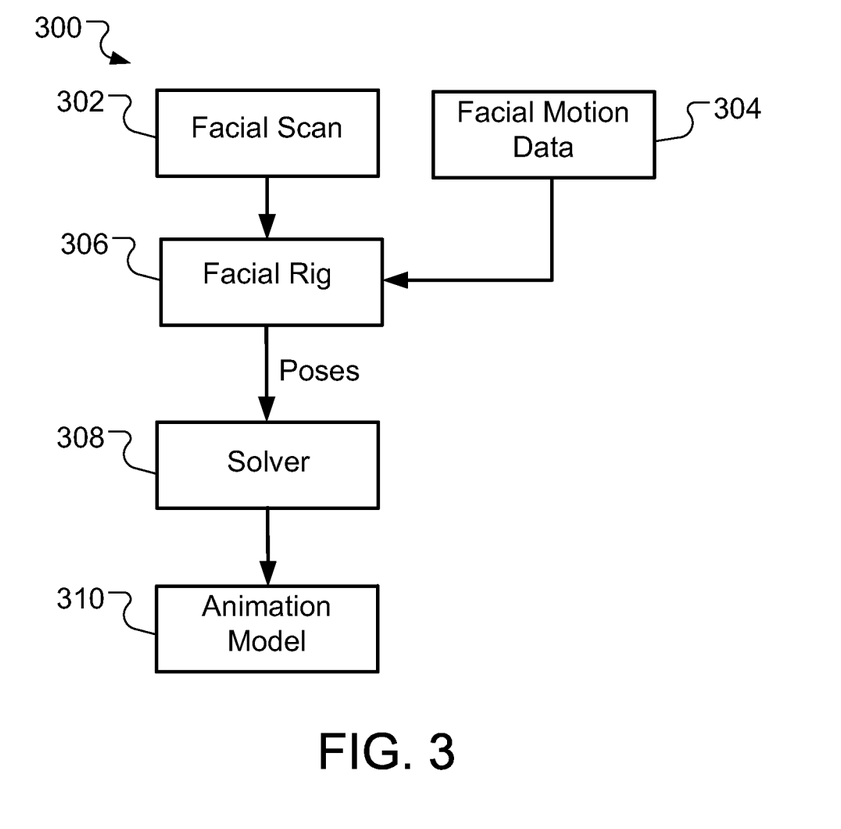
FIG. 3 is a diagram of processes for generating an animation model.

Referring to FIG. 3, a diagram 300 represents processes that are executed to perform the first stage in producing and refining an animation model. In the first stage, an initial animation model is produced that can be provided to the second stage for refinement. As illustrated with the animation system 200 in FIG. 2, two primary data sets provide the information for constructing the animation model. For the example of creating an animation model for facial expressions, a facial scan 302 of an actor is electronically created to produce a relatively high resolution likeness referred to as a facial rig 306. Along with providing the general shape of the actor's face (e.g., for a neutral facial expression), the facial rig 306 typically includes a large number of vertices to define the face in three dimensions. The second data set for producing the animation is facial motion data 304. As illustrated in FIG. 2, such data may be attained from images of the actor's face from multiple perspectives (e.g., as captured by a camera array). For example, the motion data may be represented by a relatively-low resolution mesh cage defined by vertices whose positions correspond to positions of markers applied to the actor's face. As the actor performs (e.g., speaks, makes facial expressions, etc.), motion data may be captured for each marker (on a per frame basis) and used to drive the facial rig 306 (via control parameters of the rig) produced from the facial scan data 302. In effect, the motion data 304 is retargeted such that the facial rig approximately mimics the performance of the actor represented in the motion data.

To create an animation model of the actors facial expressions, a relatively small collection of poses (e.g., two to five poses) may be identified (e.g. by an animator) from the facial rig. The collection can include various types of poses, for example, particular poses of interest based the capture motion data may be identified. Expressions of extreme emotion (e.g., joy, fear, horror, etc.) may be identified along with poses of very little emotion (e.g., a neutral expression). Facial expressions closely associated with the actor or portrayed character, i.e., so-called signature expression (e.g., a wink, a sly grin, etc.) may be identified and selected for the model production. In some instances, one or more expressions may be identified by the animator manually adjusting the facial rig 306 with or without it being driven by the facial motion data 304. Some situations that may call for animator input includes the creation of an animation model that represents a character (e.g., a non-human creature) that mimics the captured performance data of the actor. Upon being identified, the data that represents the selected facial expressions is provided to a solver 308 for producing an animation model 310. Various types of solvers may be implemented for model production from the selected facial expressions. For example, the solver 308 may implement an example-based retargeting solver technique to produce appropriate control parameters such that the selected poses are represented by the animation model 310. However, the representations created by the animation model 310 may be slightly different (e.g., facial feature movements, skin movement, etc.) compared to the captured performance of the actor. To address these differences, and effectively "tighten the bolts," the animation model 310 may be further processed (e.g., by a second processing stage) for refinement.

Figure 4:
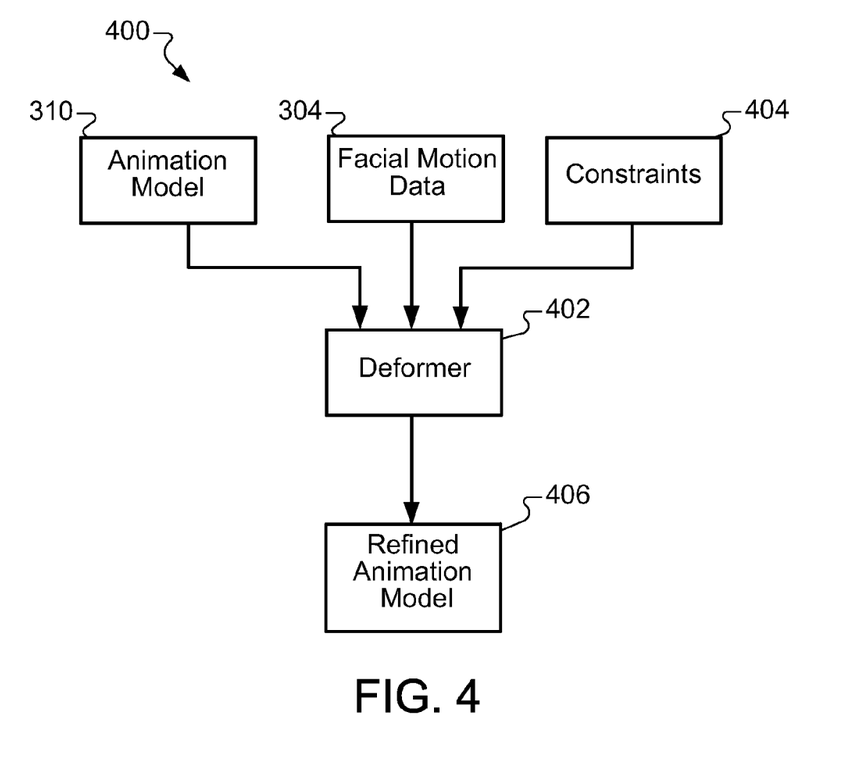
FIG. 4 is a diagram of processes for refining an animation model.

Referring to FIG. 4, a diagram 400 represents processes for refining an animation model such as the animation model 310 produced by the first stage processes illustrated in FIG. 3. In this arrangement, refining processes are considered as being executed in a second processing stage, however, a portion or all of the refinement processes may be included in a first stage (e.g., the processes shown FIG. 3). In general, the initial animation model is produced from a likeness (e.g., an electronically scanned version of the actor's face) that may be accurate in regards volume and proportions. However, the positions of vertices that define the likeness may not be extremely accurate. For example, a likeness that has been electronically sculpted by a small team of animators over a considerable amount of time may include vertices with more accurate positions. To refine the accuracy of the positions of the vertices, one or more techniques may be implemented. For example, position information of the vertices included in the captured motion information (that define the tracking cage) can be mapped to corresponding vertices in the animation model. To effectively "snap" the position of the vertices animation model to corresponding vertices of the motion data, one or more techniques may be implemented. For example, for each time instance (e.g., frame) of collected motion data, the spatial differences between corresponding vertices are calculated and applied to the respective vertices of the animation model. Since the resolution (e.g., number of vertices) of the motion data is significantly lower compared to the animation model, a considerable number of vertices in the animation model lack corresponding vertices in the motion data. For example, the number of vertices present in motion data may only correspond to ten percent of the vertices included in the animation mesh. As such, one or more techniques may be used to address the positions of vertices (that do not have a counterpart vertex in the motion data). For example, a Laplacian-based mesh deformer may be implemented as described in *On Linear Variation Surface Deformation Model*, by Mario Botsch and Olga Sorkine, IEEE TVCG 2008, which is herein incorporated by reference in its entirety. In general, by applying a Laplace operator, a function can be produced for determining the appropriate position changes for vertices represented in the animation model that lack corresponding vertices in the motion data. As such, along with improving positional accuracy of vertices in the animation model that have counterpart vertices in the motion data, accuracy may be improved for vertices lacking a counterpart in the motion data.

As illustrated, the animation model 310 and the facial motion data 304 (both represented in FIG. 3) are provided to a deformer 402 for adjusting the positions of the vertices of the animation model. In one implementation, the deformer 402 executes operations of a Laplacian based mesh deformer for refining the animation model 304. Additional information may also be provided to the deformer 402 (e.g., a Laplacian based mesh deformer) for adjusting the animation model 304. For example, one or more constraints 404 may also be provided to the deformer 402 to assist with refinements. Such constraints may be introduced for application to vertices that are not directly affected by the changes in positions (from the motion data). For example, some vertices associated with a particular feature of the facial animation (e.g., upper teeth, lower teeth, etc.) can be fixed to move in unison with another portion of the animation (e.g., the skull, jaw, etc.). Constraints may also associate the movement of geometries of some facial features (e.g., inner mouth) with geometries of multiple other features (e.g., facial skin of the character, jaw, etc.). By using these constraints 404 with the animation model 310 and the facial motion data 304, a refined animation model 406 can be produced that is capable of efficiently generating recognizable and realistic representations actor's face that can be used for a digital double in various applications (e.g., for mid and foreground shots in a motion picture).

Figure 5:
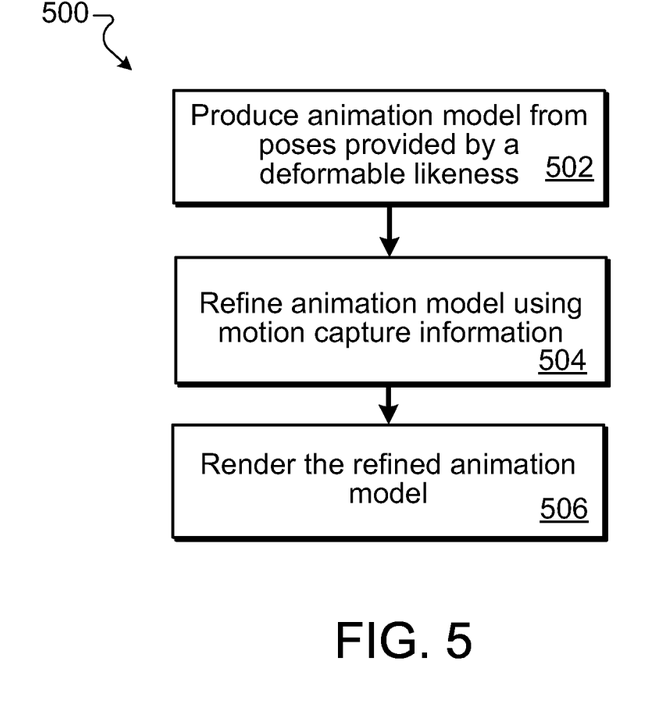
FIG. 5 is a flow chart of operations for producing a refined animation model.

Referring to FIG. 5, a flowchart 500 represents operations of a computing device such as the computer system 204 (shown in FIG. 2) to produce a refined animation model from a deformable likeness of an object (e.g., an electronically scanned version of an actor's face) and motion data captured of the actor performing for producing the animation model. Such operations are typically executed by components (e.g., one or more processors) included in a computing device, however, operations may be executed by multiple computing devices. Along with being executed at a single site (e.g., at the location of the computing device), operations execution may be distributed among two or more locations.

Operations of the computing device may include producing 502 an animation model from poses provided by a deformable likeness of an object (e.g., an actor's face). For example, the deformable likeness may be produced by electronically scanning the actor's face. By driving the deformable likeness with motion capture data (of the actor performing), poses may be selected for producing the animation model. Operations may also include refining 504 the animation model by using the motion capture information. For example, the position of facial features represented in the animation model may be mapped to positions of corresponding features represented in the motion capture information. One or more constraints may also be used for refining the animation model. Once refined, operations may also include rendering 506 one or more representations (e.g., of the actor's face) from the refined animation model. For example, facial expressions of the actor (or a character being performed by the actor) may be rendered to provide a digital double (e.g., a digital version of the actor's head) for use in an online production (e.g., a video game title) or an offline production (e.g., a motion picture).

Figure 6:
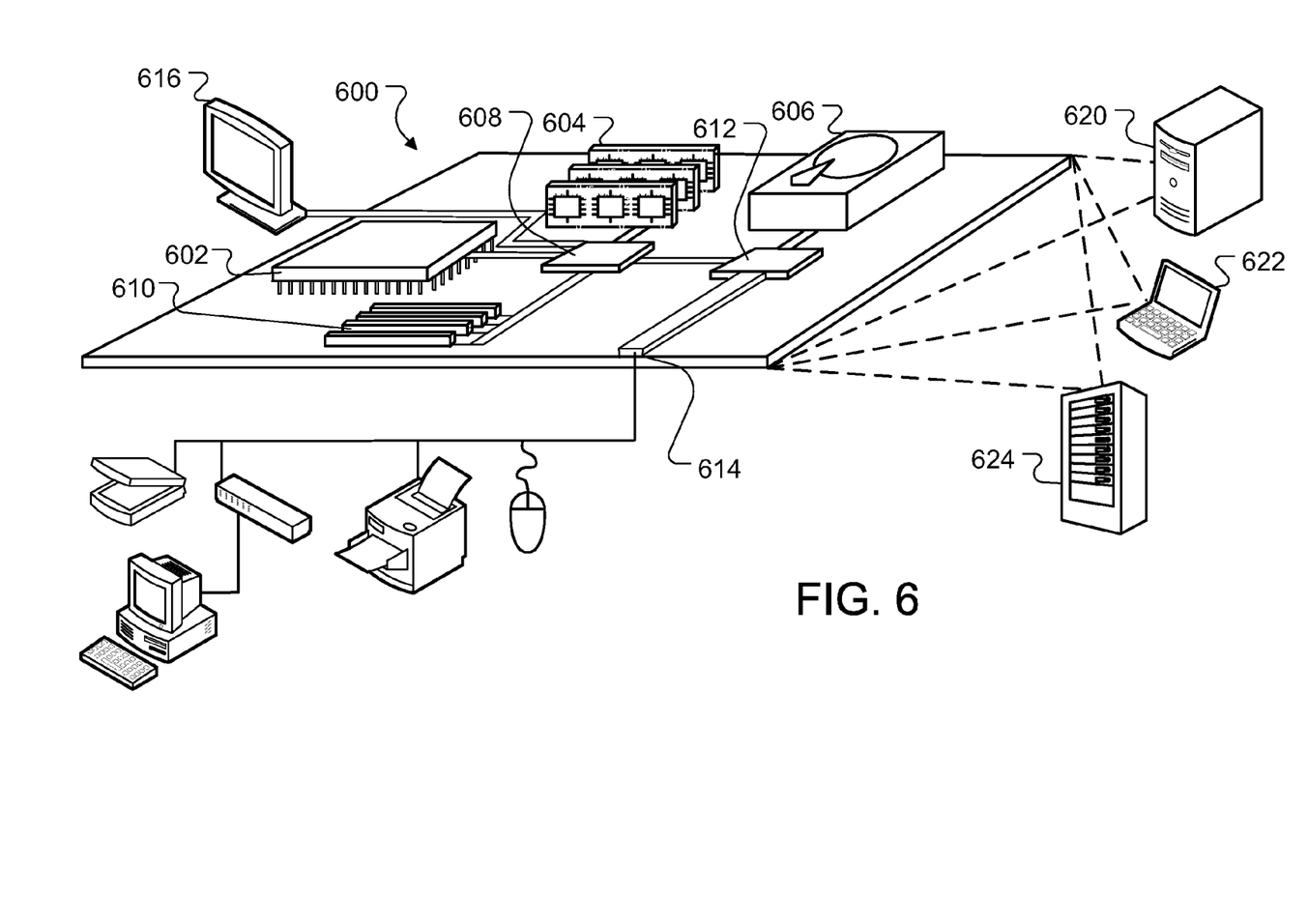
FIG. 6 shows an example of a computing device that can be used in connection with computer-implemented methods and systems described in this document.

FIG. 6 shows an example of a computing device 600 and that can be used to implement the techniques described for producing and refining an animation model. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown). Each of such devices may contain one or more of the computing device 600 and the mobile computing device, and an entire system may be made up of multiple computing devices communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
producing an initial animation model from a plurality of poses of an object provided from a deformable likeness of the object created from an electronic image of the object having first resolution and motion data of the object captured by at least one camera and represented in a second resolution, lower than the first resolution, wherein the plurality of poses are based upon position information from the motion data; and
producing a refined animation model by adjusting positions of vertices in the initial animation model to more closely correspond to vertices in the motion data and produce representations that substantially match the plurality of poses provided by the deformable likeness of the object;
wherein the initial animation model includes at least some vertices that do not have counterpart vertices in the motion data and producing the refined animation model includes mapping positional information of vertices included in the motion data to corresponding vertices in the animation model and determining positional changes for the at least some vertices that lack counterpart vertices in the motion data based on a function.

2. The computer-implemented method of claim 1, wherein refining the animation model includes adjusting the position of vertices included in the animated model to match the position information from the motion data.

3. The computer-implemented method of claim 1, wherein refining the animation model includes adjusting the position of vertices included in the animated model that lack corresponding vertices in the position information from the motion data.

4. The computer-implemented method of claim 1, wherein refining the animation model includes using a Laplacian deformer to adjust the position of vertices included in the animation model.

5. The computer-implemented method of claim 1, wherein the deformable likeness is produced from a scanned representation of the object.

6. The computer-implemented method of claim 1, wherein the motion data comprises a collection of images that depict motion of the object over a time period and the object represented in the motion data includes features for defining motion.

7. The computer-implemented method of claim 6, wherein the features include artificial features.

8. The computer-implemented method of claim 6, wherein the features include nature features.

9. The computer-implemented method of claim 1, wherein the object is a face of an actor and the plurality of poses includes facial expressions.

10. The computer-implemented method of claim 1, wherein the positions of vertices that define a likeness of the initial animation model to the object have a first accuracy level, and the positions of vertices that define a likeness of the refined animation model to the object have a second accuracy level, higher than the first accuracy level.

11. A system comprising:
one or more computing devices comprising:
memory configured to store instructions; and
one or more processors configured to execute the instructions to perform a method comprising:
producing an initial animation model from a plurality of poses of an object provided from a deformable likeness of the object created from an electronic image of the object having first resolution and motion data of the object captured by at least one camera and represented in a second resolution, lower than the first resolution, wherein the a plurality of poses are based upon position information from the motion data; and
producing a refined animation model by adjusting positions of vertices in the initial animation model to more closely correspond to vertices in the motion data produce representations that substantially match the a plurality of poses provided by the deformable likeness of the object;
wherein the initial animation model includes at least some vertices that do not have counterpart vertices in the motion data and producing the refined animation model includes mapping positional information of vertices included in the motion data to corresponding vertices in the animation model and determining positional changes for the at least some vertices that lack counterpart vertices in the motion data based on a function.

12. The system of claim 11, wherein refining the animation model includes adjusting the position of vertices included in the animated model to match the position information from the motion data.

13. The system of claim 11, wherein refining the animation model includes adjusting the position of vertices included in the animated model that lack corresponding vertices in the position information from the motion data.

14. The system of claim 11, wherein refining the animation model includes using a Laplacian deformer to adjust the position of vertices included in the animation model.

15. The system of claim 11, wherein the deformable likeness is produced from a scanned representation of the object.

16. The system of claim 11, wherein the motion data comprises a collection of images that depict motion of the object over a time period and the object represented in the motion data includes features for defining motion.

17. The system of claim 16, wherein the features include artificial features.

18. The system of claim 16, wherein the features include nature features.

19. The system of claim 11, wherein the object is a face of an actor and the plurality of poses includes facial expressions.

20. The system of claim 11, wherein the positions of vertices that define a likeness of the initial animation model to the object have a first accuracy level, and the positions of vertices that define a likeness of the refined animation model to the object have a second accuracy level, higher than the first accuracy level.

21. A computer program product tangibly embodied in a non-transitory computer readable medium and comprising instructions that when executed by a processor perform a method comprising:
producing an initial animation model from a plurality of poses of an object provided from a deformable likeness of the object created from an electronic image of the object having first resolution and motion data of the object captured by at least one camera and represented in a second resolution, lower than the first resolution, wherein the a plurality of poses are based upon position information from the motion data; and
producing a refined animation model by adjusting positions of vertices in the initial animation model to more closely correspond to vertices in the motion data and produce representations that substantially match the a plurality of poses provided by the deformable likeness of the object;
wherein the initial animation model includes at least some vertices that do not have counterpart vertices in the motion data and producing the refined animation model includes mapping positional information of vertices included in the motion data to corresponding vertices in the animation model and determining positional changes for the at least some vertices that lack counterpart vertices in the motion data based on a function.

22. The computer program product of claim 21, wherein refining the animation model includes adjusting the position of vertices included in the animated model to match the position information from the motion data.

23. The computer program product of claim 21, wherein refining the animation model includes adjusting the position of vertices included in the animated model that lack corresponding vertices in the position information from the motion data.

24. The computer program product of claim 21, wherein refining the animation model includes using a Laplacian deformer to adjust the position of vertices included in the animation model.

25. The computer program product of claim 21, wherein the deformable likeness is produced from a scanned representation of the object.

26. The computer program product of claim 21, wherein the motion data comprises a collection of images that depict motion of the object over a time period and the object represented in the motion data includes features for defining motion.

27. The computer program product of claim 26, wherein the features include artificial features.

28. The computer program product of claim 26, wherein the features include nature features.

29. The computer program product of claim 21, wherein the object is a face of an actor and the plurality of poses includes facial expressions.

30. The computer program product of claim 21, wherein the positions of vertices that define a likeness of the initial animation model to the object have a first accuracy level, and the positions of vertices that define a likeness of the refined animation model to the object have a second accuracy level, higher than the first accuracy level.

31. A system of claim 11 wherein the one or more computing devices comprises:
a first processing stage computing device having memory configured to store instructions, and a processor configured to execute the instructions to produce the initial animation model; and
a second processing stage computing device having memory configured to store instructions, and a processor configured to execute the instructions to produce the refined animation model.

32. The method of claim 1 wherein each of the initial and refined animation models comprises a three-dimensional numerical mesh.

33. The system of claim 11 wherein each of the initial and refined animation models comprises a three-dimensional numerical mesh.

34. The computer program product of claim 21 wherein each of the initial and refined animation models comprises a three-dimensional numerical mesh.

35. The system of claim 31 wherein each of the initial and refined animation models comprises a three-dimensional numerical mesh.

36. The method of claim 1 wherein determining positional changes for the at least some vertices that lack counterpart vertices in the motion data further includes applying one or more constraints to at least some vertices that lack counterpart vertices in the motion data.

37. The method of claim 36 wherein applying one or more constraints includes associating one or more vertices with a particular feature of an animation and moving the associated vertices in unison with another portion of the animation.

38. The method of claim 36 wherein applying one or more constraints includes associating movement of a geometry of some feature with geometries of multiple other features.

39. The system of claim 11 wherein determining positional changes for the at least some vertices that lack counterpart vertices in the motion data further includes applying one or more constraints to at least some vertices that lack counterpart vertices in the motion data.

40. The system of claim 39 wherein applying one or more constraints includes associating one or more vertices with a particular feature of an animation and moving the associated vertices in unison with another portion of the animation.

41. The system of claim 39 wherein applying one or more constraints includes associating movement of a geometry of some feature with geometries of multiple other features.

42. The computer program product of claim 21 wherein determining positional changes for the at least some vertices that lack counterpart vertices in the motion data further includes applying one or more constraints to at least some vertices that lack counterpart vertices in the motion data.

43. The computer program product of claim 42 wherein applying one or more constraints includes associating one or more vertices with a particular feature of an animation and moving the associated vertices in unison with another portion of the animation.

44. The computer program product of claim 42 wherein applying one or more constraints includes associating movement of a geometry of some feature with geometries of multiple other features.

45. The method of claim 1 wherein the initial animation model and the refined animation model represent facial expressions of the object and the plurality of poses of the object include at least one facial expression of extreme emotion and a neutral facial expression.

46. The system of claim 11 wherein the initial animation model and the refined animation model represent facial expressions of the object and the plurality of poses of the object include at least one facial expression of extreme emotion and a neutral facial expression.

47. The computer program product of claim 21 wherein the initial animation model and the refined animation model represent facial expressions of the object and the plurality of poses of the object include at least one facial expression of extreme emotion and a neutral facial expression.

48. The method of claim 10 wherein the initial animation model defines a shape and motion of the object.

49. The system of claim 20 wherein the initial animation model defines a shape and motion of the object.

50. The computer program product of claim 30 wherein the initial animation model defines a shape and motion of the object.

51. The method of claim 48 wherein the initial animation model and the refined animation model represent the same object.

52. The system of claim 49 wherein the initial animation model and the refined animation model represent the same object.

53. The computer program product of claim 50 wherein the initial animation model and the refined animation model represent the same object.

\* \* \* \* \*

UNITED STATES PATENT AND TRADEMARK OFFICE
CERTIFICATE OF CORRECTION

| | | |
|---|---|---|
| PATENT NO. | : 9,196,074 B1 | Page 1 of 1 |
| APPLICATION NO. | : 13/168389 | |
| DATED | : November 24, 2015 | |
| INVENTOR(S) | : Kiran S. Bhat et al. | |

It is certified that error appears in the above-identified patent and that said Letters Patent is hereby corrected as shown below:

In The Claims

Column 13, Claim 11, Lines 15-16:

Replace "...wherein the a plurality of poses are based upon position information from the motion data..." with --...wherein the plurality of poses are based upon position information from the motion data...--

Column 13, Claim 11, Lines 20-22:

Replace "...representations that substantially match the a plurality of poses provided by the deformable likeness of the object;..." with --...representations that substantially match the plurality of poses provided by the deformable likeness of the object;...--

Column 14, Claim 21, Lines 3-4:

Replace "...wherein the a plurality of poses are based upon position information from the motion data..." with --...wherein the plurality of poses are based upon position information from the motion data...--

Column 14, Claim 21, Lines 8-10:

Replace "...representations that substantially match the a plurality of poses provided by the deformable likeness of the object;..." with --...representations that substantially match the plurality of poses provided by the deformable likeness of the object;...--

Signed and Sealed this
Twenty-sixth Day of April, 2016

Michelle K. Lee
*Director of the United States Patent and Trademark Office*